United States Patent [19]

Krempel

[11] 4,439,160
[45] Mar. 27, 1984

[54] VISUAL COMMUNICATION SYSTEM

[76] Inventor: Ralf Krempel, 2400 Pacific Ave., San Francisco, Calif. 94115

[21] Appl. No.: 401,627

[22] Filed: Jul. 26, 1982

[51] Int. Cl.³ .............................................. G09B 19/00
[52] U.S. Cl. ...................................................... 434/170
[58] Field of Search ........................................... 434/170

[56] References Cited

U.S. PATENT DOCUMENTS 3,813,471  5/1974  Dean ..................................... 434/170
3,982,333  9/1976  Farmer .................................. 434/170
4,345,902  8/1982  Hengel .................................. 434/170

FOREIGN PATENT DOCUMENTS 1521793   3/1968  France ................................. 434/170
  94162   6/1969  France ................................. 434/170
2448758  10/1980  France ................................. 434/170

*Primary Examiner*—William H. Grieb

[57] ABSTRACT

The Visual Communication System is utilizing in a prearranged sequence various markings in different colors to form an informational code similar to a written language.

2 Claims, 2 Drawing Figures

FIG.1

| 1 ᵇ | 2 ˡ | 3 ᵃ | 4 ᶜ | 5 ᵏ | © 1982 |
|---|---|---|---|---|---|
| A | B | C | D ○ | E ○ | red |
| F | G ○ | H ○ | I ○ | J ○ | yellow |
| K ○ | L ○ | M ○ | N ○ | O ○ | green |
| P | R | S ○ | T ○ | U ○ | blue |
| V | W | X | Y | Z ○ | orange |
| Q = 1 ○ green | | + 2 ○ ○ | | | orange |

KREMPEL CODE – VISUAL COMMUNICATION SYSTEM

KREMPEL CODE

VISUAL COMMUNICATION SYSTEM

VISUAL COMMUNICATION SYSTEM

SUMMARY OF THE INVENTION

The principal object of the VISUAL COMMUNICATION SYSTEM invention, is the fact that by using different color dots, squares as well as any other forms or figures,—even letters and differently shaded shapes to simulate the different colors will work, can create, if given the color system and numerical order, a visual alphabet.

Whereby it will be easy under the VISUAL COMMUNICATION SYSTEM just by changing around the established number and color of the markings to produce a cryptographic script, the main purpose of the VISUAL COMMUNICATION SYSTEM is not the scrambled effect for the reason of portraying secret messages but instead exactly the opposite direction is aimed and desired for because by working in an open widely known manner the rules of the VISUAL COMMUNICATION SYSTEM can easily infiltrate into the universal knowledge for the beneficial enrichment and enlightenment of all modern humankind.

By memorizing the simple letter order of the VISUAL COMMUNICATION SYSTEM color method very soon the general public is able to read not only single letters, but words, sentences as well as anything else just by looking at the displayed color markings.

The range of the VISUAL COMMUNICATION SYSTEM will be endless. It can be used in any environment for relaying and conveying messages and information of all kinds and sorts in the fields of the Art, Poetry, Science, Education, Communication, Advertisement, Computers, Toys and Games and so forth.

BRIEF DESCRIPTION OF THE DRAWINGS

FIG. 1 illustrates a designed visual record of the system known by the name of VISUAL COMMUNICATION SYSTEM OR KREMPEL CODE.

DESCRIPTION OF THE PREFERRED EMBODIMENT

Figure 2:
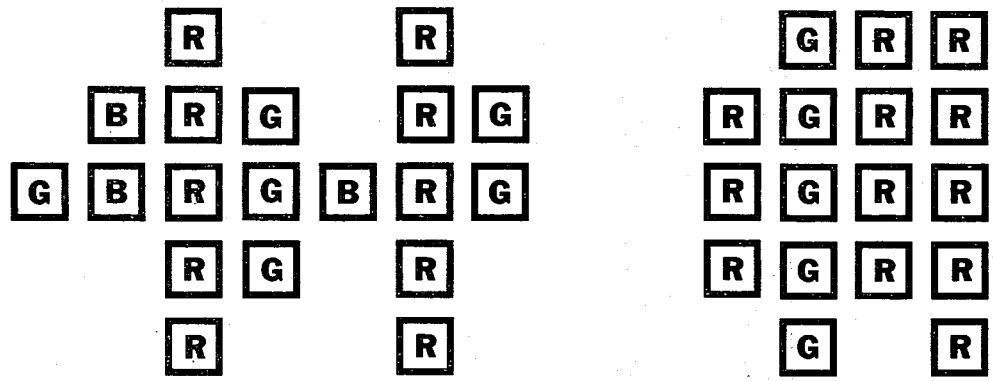
FIG. 2 illustrates a three line sampler of the accord.
Figure 2:
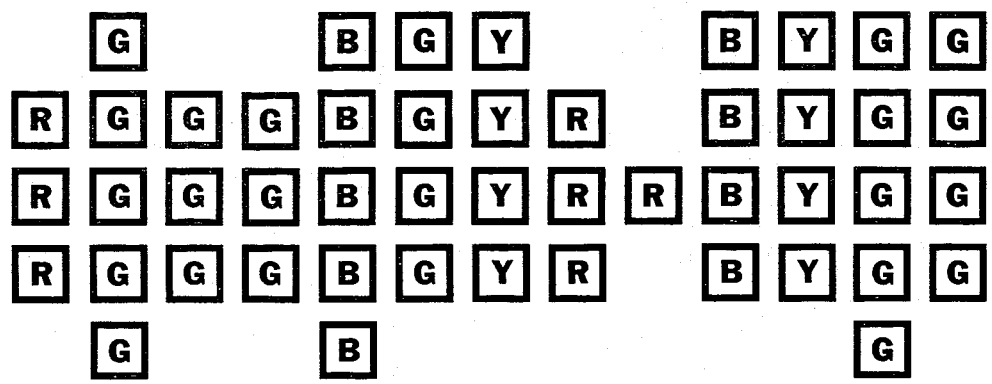
Figure 2:
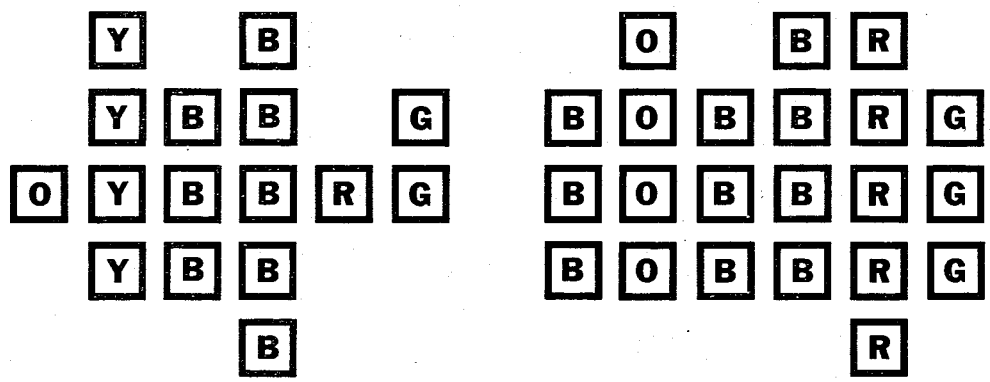

Utilizing a five color scheme on a black background, any other background or no background at all the 26 letters of the English, German and any other modern alphabet which uses the 26 letter sequence are subdivided into a detailed systematic diagram of display.

Each of the letters is positioned in the array of 1 to 5. Placing the Number 1 in the center role. Number 2 is placed one in the center and one above. Number 3 is one in the center, one above and one below. Number 4 is one in the center, two above and one below. Finally Number 5 is one in the center, two above and two below.

The first 5 letters A B C D E are using the color red. A gets thereby the center role and E the 5 row position of red. The second 5 letters F G H I J are using the color yellow. F gets thereby the center role and J the 5 row position of yellow. The third 5 letters K L M N O are using the color green. K gets thereby the center role and 5 row position of green. The fourth 5 letters P R S T U are using the color blue. P gets thereby the center role and U the 5 row position of blue. The fifth 5 letters V W X Y Z are using the color orange. V gets thereby the center role and Z the 5 row position of orange. The letter Q finally has in its 3 row position in the center the color green and one above and one below white.

The same interpretation can also be explained by the simple diagramed charts as follows:
RED: A=1, B=2, C=3, D=4, E=5
YELLOW: F=1, G=2, H=3, I=4, J=5
GREEN: K=1, L=2, M=3, N=4, O=5
BLUE: P=1, R=2, S=3, T=4, U=5
ORANGE: V=1, W=2, X=3, Y=4, Z=5
Q=1 GREEN+2 ORANGE or A=1red, B=2red, C=3red, D=4red, E=5re
F=1yellow, G=2ye, H=3ye, I=4ye, J=5ye
K=1green, L=2gre, M=3gr, N=4gr, O=5gr
p=1blue, R=2blue, S=3bl, T=4bl, U=5bl
V=1orange, W=2or, X=3or, Y=4or, Z=5or
Q=1green+2orange Other additional letters, like for instance the German umlaut Ä Ö Ü or the French accent marks e e c will be demonstrated by adding the specialcharacteristics of the letters in the center of the top or bottom color symbol.

Although the VISUAL COMMUNICATION SYSTEM system works primarily in color, in FIG. 2 for illustrating purposes a black square mode of identification has been used wherein the different colors have been marked by letters as follows:
R for red
Y for yellow
G for green
B for blue
O for orange The three line VISUAL COMMUNICATION SYSTEM sampler in FIG. 2 reads the following:
KREMPEL CODE
COMMUNICATION
VISUAL SYSTEM To demonstrate the language the individual VISUAL COMMUNICATION SYSTEM display is in, the mode of depiction utilizes at the bottom the appropriate number of color symbols for the first letter of the name of the language in horizontal instead of vertical fashion on the right and left side of the words KREMPEL CODE. The VISUAL COMMUNICATION SYSTEM can according to the above explanation also be utilized by employing the shape of the cubic form. Each of the six face sides of the cube is hereby covered with a different color. One side is red, clockwise the next yellow, then green followed by blue. The bottom in orange and the top is black/neutral. Or any other color combination is possible.

By using for an example a bordered square tray or board of 17 horizontal and vertical spaces, on which in either direction can be played, it is possible with 289 square cubes marked with the 6 color combination to form 3 lines each of 17 different displayed pictorial letters. 5 rows are needed thereby for the top line. One row remains free for space. Thereafter follows the second line of 5 rows. Again another free row is needed followed by the 5 rows of the bottom line. To aid the forming of the lines, center ,line indication marks are applied to all sides of the bordered tray or board, marking the middle row of every line. Hence on a square tray or board with 17 spaces on each side, the center line indication marks are in the middle as well as 3 away from every corner on the elevated border strips.

Naturally there are other and further combinations and uses, to numerous to mention, possible for the VISUAL COMMUNICATION SYSTEM.

Herewith the invention has been described and detailed in specific terms. However modifications can occur to those skilled in the field of the state of art. As for the true scope of the invention reference should also be made to the appended claims.

What is claimed is:

1. A visual communication device comprising;
    a code carrier means divided into a plurality of rows and columns;
    each of said rows being designated by a different color indicium;
    each of said columns being designated by a different number indicium;
    letters of an alphabet located in said rows and columns of said code carrier means;
    whereby each of said letters can be designated by a quantity of symbols of the same color as, and equal in number to, the color and number indicia which designates the row and column on the code carrier means where the alphabet letter is located.

2. A method of visual communication using colors comprising the steps of;
    dividing the letters of an alphabet into a plurality of rows and columns on a code carrier means;
    designating each of said rows on said code carrier means with a different color;
    designating each of said columns on said code carrier means with a different number;
    applying symbols to an information carrier means in lieu of alphabet letters, the symbols being of the same color as, and equal in number to, the color and number indicia which designates the row and column on the code carrier means where the corresponding alphabet letter is located.

* * * * *

UNITED STATES PATENT AND TRADEMARK OFFICE
CERTIFICATE OF CORRECTION

PATENT NO. : 4,439,160

DATED : Mar. 27, 1984

INVENTOR(S) : Ralf Krempel

Page 1 of 2

It is certified that error appears in the above-identified patent and that said Letters Patent is hereby corrected as shown below:

| Column | Line | |
|---|---|---|
| 1 | 7 | "invention, is" should read "invention is" |
| 1 | 11 | "the color system" should read "the color sequence system" |
| 1 | 40 | "SYSTEM OR KREMPEL CODE" should read "SYSTEM or KREMPEL CODE" |
| 1 | 64 | "and 5 row position" should read "and 0 the 5 row position" |
| 2 | 2 | "white" should read "orange" |
| 2 | 15 | "p=1blue," should read "P=1blue," |
| 2 | 19 | "French accent marks e e c" should read "French accent marks é è ç" |
| 2 | 20 | "specialcharacteristics" should read "special characteristics" |

UNITED STATES PATENT AND TRADEMARK OFFICE
CERTIFICATE OF CORRECTION

PATENT NO. : 4,439,160

DATED : Mar. 27, 1984

INVENTOR(S) : Ralf Krempel

It is certified that error appears in the above-identified patent and that said Letters Patent is hereby corrected as shown below:

Page 2 of 2

| Column | Line | (continued) |
|---|---|---|
| 2 | 43 | New paragraph beginning with "The VISUAL COMMUNICATION SYSTEM" |
| 2 | 48 | "The bottom in orange" should read "The bottom is orange" |
| 2 | 60 | "center ,line" should read "center line" |
| 2 | 64 | "as well as 3 away" should read "as well as 3 rows away" |
| 4 | 4 | "comprising" should be moved two spaces to the right. |

Signed and Sealed this

Fourth Day of June 1985

[SEAL]

Attest:

DONALD J. QUIGG

Attesting Officer

Acting Commissioner of Patents and Trademarks